G. G. GREENE.
CASTER.
APPLICATION FILED JULY 29, 1914.

1,150,359.

Patented Aug. 17, 1915.

Inventor
G. G. Greene.

UNITED STATES PATENT OFFICE.

GLENN G. GREENE, OF WARREN, PENNSYLVANIA.

CASTER.

1,150,359.

Specification of Letters Patent.

Patented Aug. 17, 1915.

Application filed July 29, 1914. Serial No. 853,872.

*To all whom it may concern:*

Be it known that I, GLENN G. GREENE, a citizen of the United States, residing at Warren, in the county of Warren and State of Pennsylvania, have invented certain new and useful Improvements in Casters, of which the following is a specification, reference being had therein to the accompanying drawing.

This invention relates to certain new and useful improvements in casters and more particularly to centering and retaining means for holding the caster in its proper position within a tubular leg; the object being to provide a centering and retaining device which is exceedingly simple and cheap in construction and one in which the caster pintle is permanently fastened.

Another object of the invention is to provide a caster in which the centering and retaining member thereof, is formed of substantially inverted U-shaped arms preferably formed of spring wires mounted within a base and connected to a cap which rests upon the top of the pintle in order to allow the pintle to rotate freely: said spring arms bearing against the inner face of the tubular leg in order to hold the caster in its proper position by frictional contact.

Another object of the invention is to provide novel means for securing the inverted U-shaped arms in position upon the cap, whereby the centering and retaining member can be manufactured cheaply and applied to a caster.

Other and further objects and advantages of the invention will be hereinafter set forth and the novel features thereof defined by the appended claim.

Figure 1:
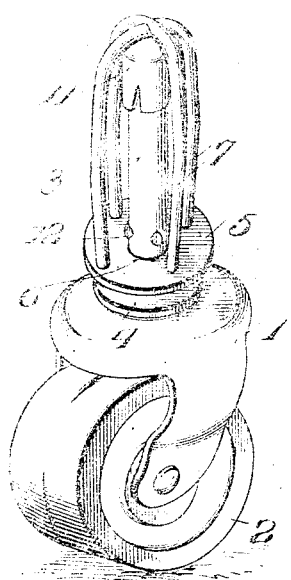
Figure 3:
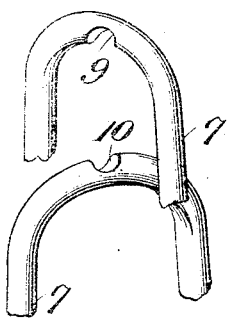
Figure 2:
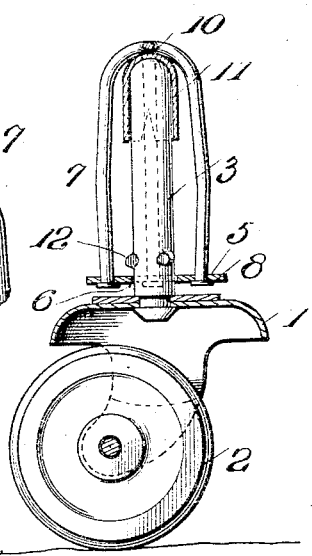
Figure 4:
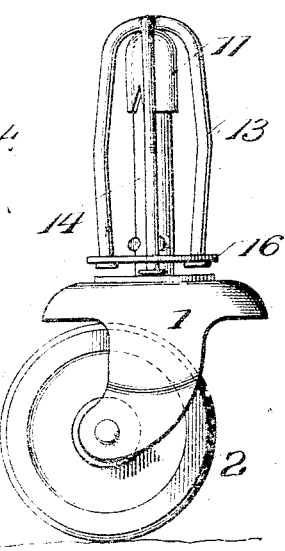
Figure 5:
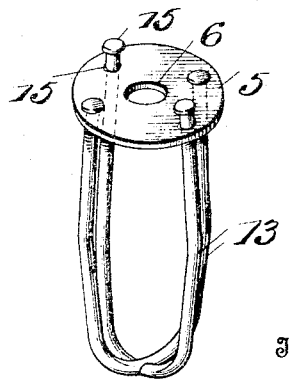

In the drawings—Figure 1, is a perspective of my improved construction of caster; Fig. 2, is a vertical transverse section through the same; Fig. 3, is a detail perspective showing the construction of the U-shaped arms and manner of securing the same in position in relation to each other; Fig. 4, is a side elevation of a slightly modified form in which one pair of spring arms are free to move slightly in order to expand or contract; and Fig. 5, is a detail perspective of the centering and retaining member frame, detached.

Like numerals of reference refer to like parts in the several figures of the drawings.

In the drawing, 1 indicates a caster frame of the ordinary construction having a wheel 2 and provided with a vertically disposed pintle 3 which is annularly reduced at its lower end and extends through an opening formed in the frame 1 and through an opening formed in a reinforcing disk 4 arranged upon the frame; said pintle having its lower end swaged so as to form a head in order to securely fasten the same in a rigid position.

My improved construction of centering and retaining member as shown in Figs. 1, 2 and 3, comprises a circular base 5 which is provided with a central opening 6, through which the pintle 3 extends; said base having oppositely arranged openings through which the lower ends of a pair of substantially inverted U-shaped arms 7 extend and are secured by forming heads upon the ends as clearly shown at 8; said arms having reduced portions 9 and 10 where they overlap into which the respective arms are adapted to fit in order to form a half-joint. The arms 7 are mounted upon a tubular cap 11 and secured in position thereon by spot welding or soldering which also secures the two arms in interlocked position so as to hold the same firmly. By this construction, the frames which are preferably formed of wire, are fastened together at right angles to each other in such a manner that when inserted within a tubular leg, they will have frictional contact against the inner face thereof. The cap 11 is adapted to rest upon the upper end of the pintle 3 in order to support the centering and retaining member above the frame of the caster, as clearly shown in Fig. 2; the base of the centering and retaining member forming a support for the tubular leg into which the caster is inserted.

In order to securely fasten the pintle within the centering and retaining member, the same is upset to form lugs 12 as clearly shown, after it has been placed in position upon the pintle and it will be noticed that these lugs are slightly spaced from the supporting base 5 in order to allow a slight vertical movement of the same upon the pintle. In this manner, the centering and retaining member is locked in position upon the pintle of the caster in such a manner that the same is allowed to rotate freely but is prevented from being moved vertically from off of the pintle.

In the modifications shown in Figs. 4 and 5, the caster frame 1 is constructed identical with that shown in the preferred form and a centering and retaining member 13 is substantially the same with the exception that one pair of the spring arms 14 thereof extend through openings 15 of the base 16; said openings being of a larger diameter than the diameter of the arms in order to allow a movement of the arms within said openings so as to allow said arms to expand and contract when the same are being forced within or drawn from out of a tubular leg.

From the foregoing description, it will be seen that I have provided a caster with a centering and retaining member secured in position thereon in such a manner that it cannot be removed, whereby all danger of the caster being accidentally withdrawn from the centering and retaining member is prevented and an exceedingly simple and cheap construction of centering and retaining member is formed which when in position within a tubular leg, will securely hold and center the caster therein. This construction of centering and retaining member is especially adapted to be used in connection with tubular legs of small diameters and upon a cheap class of furniture.

I claim:

The combination with a caster, having a pintle provided with a rounded upper end, of a tubular-shaped cap having a socket corresponding in shape to the upper end of said pintle mounted thereon, cross arms provided with reduced portions interlocked together and secured upon the top of said cap, and a base surrounding said pintle carried by the ends of said arms, said pintle having projections for limiting the upward movement of said base upon said pintle.

In testimony whereof I affix my signature in presence of two witnesses.

GLENN G. GREENE.

Witnesses:
T. L. HAMPSON,
ARCHIE J. BOWELL.